April 5, 1932.  F. A. RINGWALD, JR  1,852,626
PROPELLER FOR AIRCRAFT
Filed May 24, 1930   2 Sheets-Sheet 1
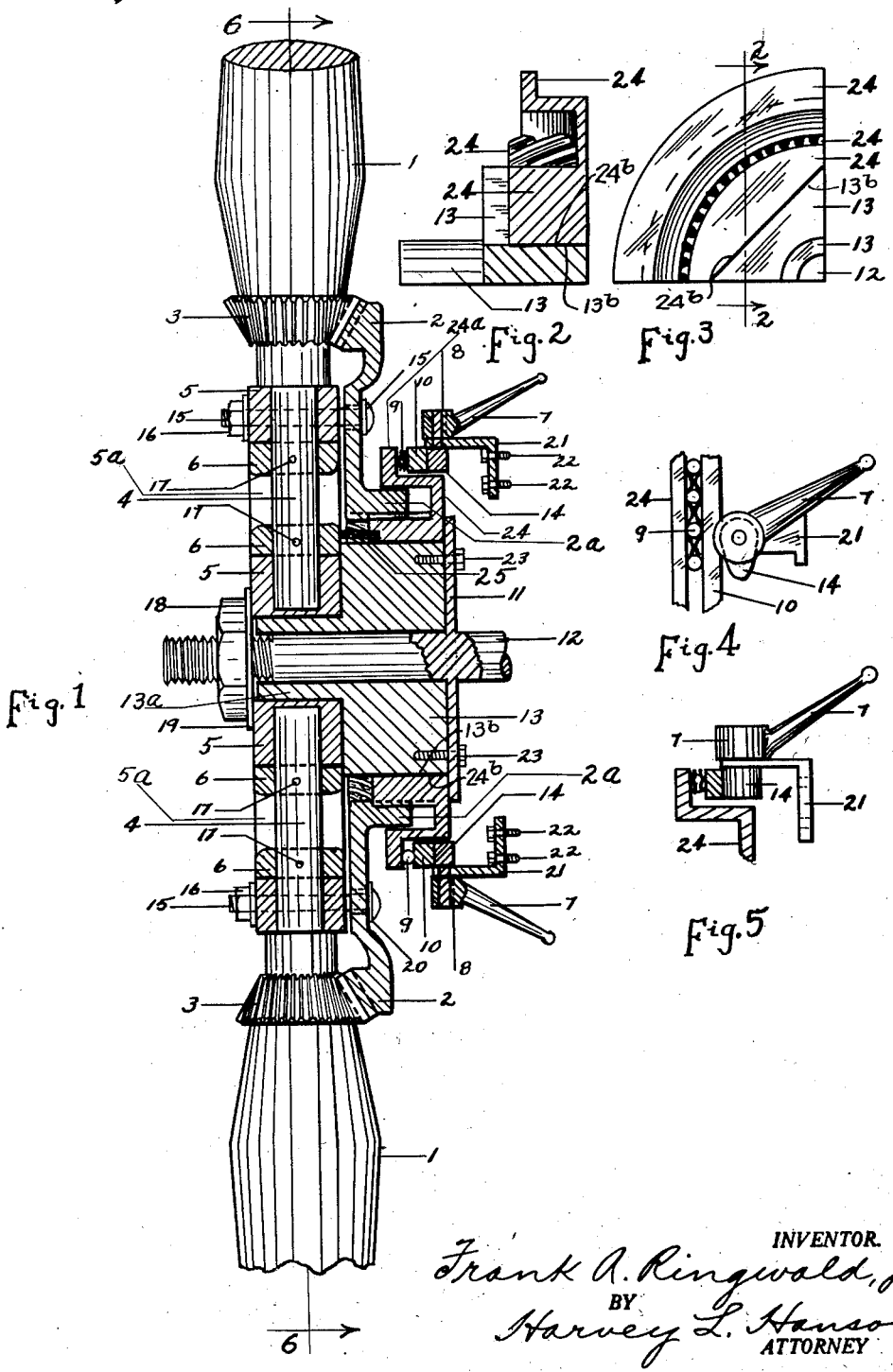

April 5, 1932.  F. A. RINGWALD, JR  1,852,626
PROPELLER FOR AIRCRAFT
Filed May 24, 1930    2 Sheets-Sheet 2
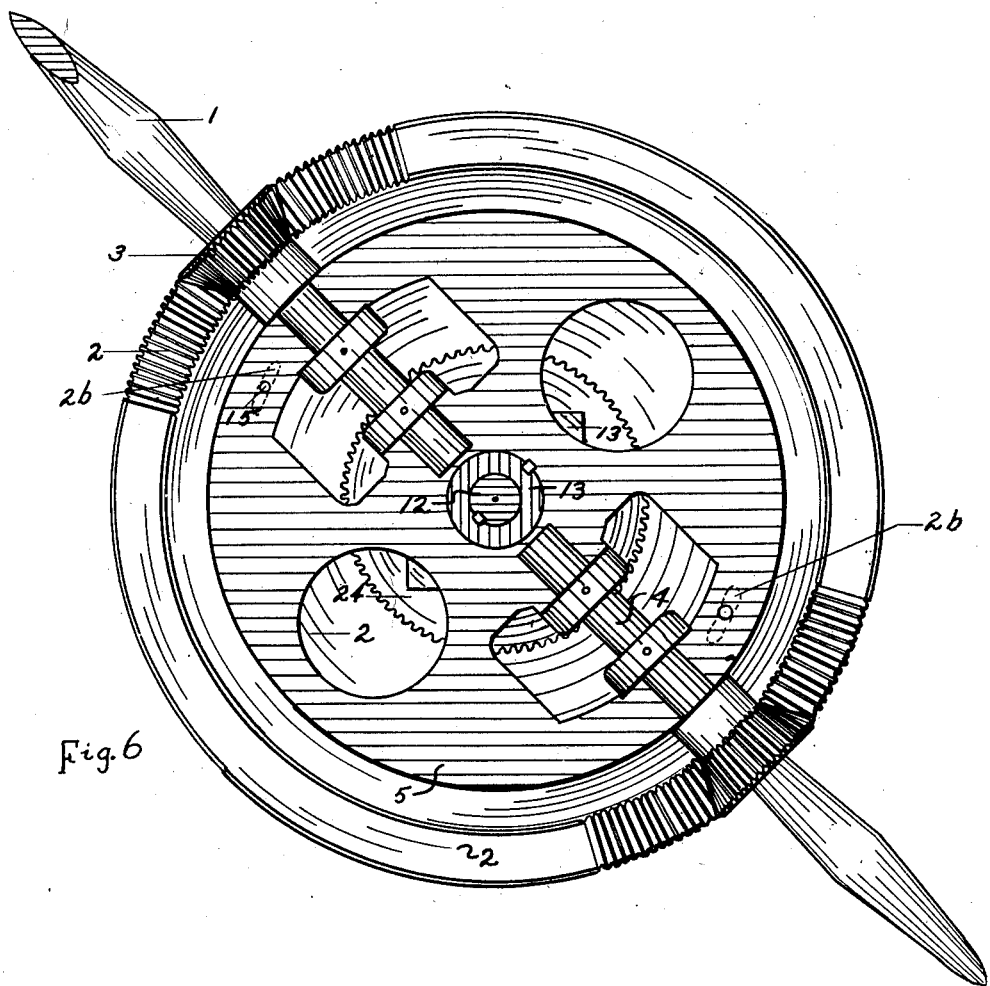
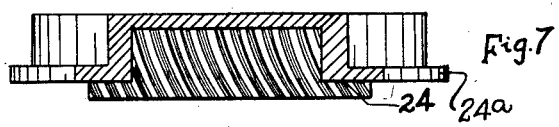
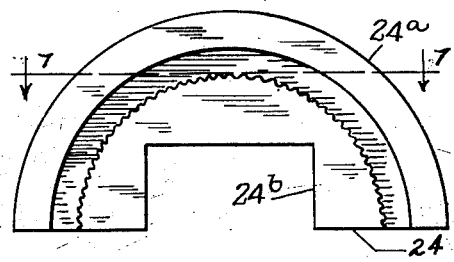
INVENTOR.
Frank A. Ringwald, Jr.
BY Harvey L. Hanson
ATTORNEY Patented Apr. 5, 1932

1,852,626

UNITED STATES PATENT OFFICE

FRANK A. RINGWALD, JR., OF CHICAGO, ILLINOIS

PROPELLER FOR AIRCRAFT

Application filed May 24, 1930. Serial No. 455,249.

My invention relates to propellers for aircraft, and particularly to an improved construction of propeller mechanism for aircraft, by which the blades of the propeller may be given different desired inclinations, while the propeller is in motion. In this way, different speeds may be secured between an idling condition of the propeller and maximum speed of the aircraft, while the propeller is in motion, and without the need of changing the engine speed, and furthermore, if desired, the change of inclination of the propeller blades may be carried beyond their neutral position, to effect a reversing of the tractive force exerted by the propeller on the aircraft.

By my invention I secure the results described by controlling mechanism which is non-rotary, the devices employed to change the inclination of the propeller blades being of simple but effective construction, free from brake bands or brakes of any description and having a multiplicity of engaging surfaces for turning the blades, to the end that wear and friction on the parts are reduced to a minimum.

My improved construction may be applied in any connection where it is desired to change the inclination of propeller blades, whether in connection with aircraft or otherwise.

My invention will best be understood by reference to the accompanying drawings showing a preferred embodiment thereof, in which Figure 1 is a vertical, longitudinal, sectional view through the devices mounting the propeller blades on a driving shaft, and through the mechanism employed to change the inclination of the blades, Figure 2 is a vertical, sectional view through a part of the gearing employed to change the inclination of the propeller blades, this view being taken along the lines 2—2 in Figure 3, Figure 3 shows in front elevation, one-quarter of the gearing and mounting members illustrated in Figure 1, for controlling the changing of the inclination of the blades, Figure 4 shows in plan view one of the arms employed to operate the gearing used to change the inclination of the propeller blades, Figure 5 shows in side elevation the parts illustrated in Figure 4, Figure 6 is a vertical, sectional view through the disk carrying the propeller blades, taken along the line 6—6 in Figure 1, and in this view, the gearing employed to change the inclination of the propeller blades is shown in front elevation, Figure 7 is a horizontal sectional view through a part of the gearing employed to change the inclination of the propeller blades, this being taken along the line 7—7 in Figure 8, and Figure 8 shows in front elevation, one-half of a combined gear and operating member used to control the inclination of the propeller blades.

Similar numerals refer to similar parts throughout the several views.

As shown in the drawings, a driving shaft 12 is illustrated, upon which the propeller blades 1, 1 are mounted for rotation to drive the aircraft or other device, said shaft being driven from any suitable source of power employed to operate the propeller.

The shaft 12 carries a flange 11, which is preferably integral with said shaft, and a block 13, which preferably has a flat sided periphery 13b, is secured to the flange 11 by bolts or screws 23, and is also keyed to the shaft 12 as indicated. The forward portion of the block 13 is of reduced diameter of cylindrical conformation as indicated at 13a, and upon this portion 13a, a disk 5 is tightly fitted and secured in place by a suitable key as indicated. The shaft 12 on its forward end is provided with a nut 18 and washer 19 to hold the parts described in their assembled relation.

The disk 5 is provided with opposite radial bores for receiving the stub-shafts 4, 4 to which the propeller blades 1, 1 are rigidly secured, so that the shafts 4, 4 may turn in said bores. Intermediate the ends of each shaft 4, the disk 5 is provided with an opening 5a in which collars 6, 6 are located, said collars being rigidly secured to the shaft 4 extending across said opening, for example, by pins 17, to hold the shaft in place in its bore in the disk 5.

Outside of the disk 5, each shaft 4 has rigidly secured thereto, a bevel gear 3, and these bevel gears 3, 3 mesh with a relatively large diameter bevel gear 2 carried coaxially with the shaft 12 as follows: A blade operating member 24 is mounted on the periphery of the block 13, said member 24 having a bore 24b fitting the flat sided periphery of the block 13, so that said member may be moved longitudinally on said block.

The member 24 is provided on its outer surface with multiple screw threads of large pitch as indicated in Figures 2 and 7, which mesh with similar threads formed internally in the hub 2a of the bevel gear 2. The disk portion of the gear 2 is provided with annular slots 2b as indicated in Figure 6, through which bolts 15 extend, said bolts also extending through the disk 5, so that the gear 2 may move angularly relatively to the disk 5, the bolts 15 being held in place by nuts 16, and serving to hold the teeth of the gear 2 in mesh with the teeth of the gears 3, 3. The flange 11 is of greater diameter than the block 13, to retain the member 24 in place on said block between said flange and the disk 5.

The member 24 has formed on its rear end, a flange member 24a, extending around the hub 2a and outwardly outside of said hub to constitute one member of a ball bearing 9, the other member of which is a ring 10, engaged by cams 14 carried by stationary brackets 21 supported from any convenient stationary part of the device, for example the engine driving the shaft 12, by bolts or screws 22.

The cams 14 are rotary and are connected with operating handles 7, so that moving said handles turns the cams 14 to impart longitudinal movement to the ring 10, and thereby similar movement to the member 24.

As a result of the construction described, when it is desired to change the inclination of the propeller blades 1, 1, the handles 7, 7 are turned to press the lobes of the cams 14, 14 against the ring 10, which moves the member 24 towards the disk 5.

Since the member 24 is incapable of angular movement relatively to the block 13 and the disk 5, this longitudinal movement of the member 24 due to the shape of the engaging threads carried by it and the hub 2a, imparts angular movement to the gear 2 relatively to the disk 5, and thereby imparts angular movement to the gears 3, 3 and to the propeller blades 1, 1. In this way the pitch of the propeller blades may be changed as desired, either while the blades are in motion or at rest.

The pitch of the blades is preferably arranged so that when the handles 7 are again moved to the position indicated in Figure 4, the fluid pressure on the blades 1, 1 will move the gear 2 in a direction angularly to move the member 24 back to the position indicated in Figure 1. To insure this return movement of the member 24, a spring 25 may be disposed around the block 13 between the disk 5 and the member 24.

While I have shown my invention in the particular embodiment above described, it will be understood that I do not limit myself to this exact construction as I may employ equivalents known to the art at the time of the filing of this application without departing from the scope of the appended claims.

What I claim is:

1. Inclination controlling mechanism for propeller blades, consisting of the combination of a propeller driving shaft, propeller blades having stub-shafts extending from them towards said driving shaft, bearings for said stub-shafts carried by said driving shaft, a first bevel gear secured to each of said blades, a second bevel gear meshing with said first bevel gears, a control member movable longitudinally of said driving shaft and restrained from rotary movement relatively thereto, spirally disposed cooperating members carried by said control member and said second gear and moving said second gear angularly relatively to said driving shaft for longitudinal movement of said control member, and devices for imparting longitudinal movement to said control member, said devices comprising rotary cams and means for turning them.

2. Inclination controlling mechanism for propeller blades, consisting of the combination of a propeller driving shaft, propeller blades having stub-shafts extending from them towards said driving shaft, bearings for said stub-shafts carried by said driving shaft, a first bevel gear secured to each of said blades, a second bevel gear meshing with said first bevel gears, a control member movable longitudinally of said driving shaft and restrained from rotary movement relatively thereto, cooperating spiral gears carried by said second gear and said control members, and devices for imparting longitudinal movement to said control member, said devices comprising rotary cams and means for turning them.

3. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, and devices for imparting longitudinal movement to said control member.

4. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, and devices for imparting longitudinal movement to said control member, said second gear having a hub surrounding the inner portion of said control member, and said control member having a flange portion extending around said hub and outwardly for engagement by said devices.

5. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, and devices for imparting longitudinal movement to said control member, said second gear having a hub surrounding the inner portion of said control member, and said control member having a flange portion extending around said hub and outwardly for engagement by said devices, said spiral gears being carried by the outer surface of the inner portion of said control member and by the inner portion of said hub.

6. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, devices for imparting longitudinal movement to said control member, and a flange carried by said driving shaft and secured to said block and extending beyond said block to hold said control member thereon.

7. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, devices for imparting longitudinal movement to said control member, and bolts extending through said disk and said second gear and holding said second gear in mesh with said first gears.

8. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, devices for imparting longitudinal movement to said control member, and a ball-bearing between said devices and said control member.

9. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, and devices for imparting longitudinal movement to said control member, said devices comprising rotary cams and means for turning them.

10. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, devices for imparting longitudinal movement to said control member, said second gear having a hub surrounding the inner portion of said control member, said control member having a flange portion extending around said hub and outwardly for engagement by said devices, said spiral gears being carried by the outer surface of the inner portion of said control member and by the inner portion of said hub, and a ball-bearing between said devices and said control member.

11. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, devices for imparting longitudinal movement to said control member, said second gear having a hub surrounding the inner portion of said control member, said control member having a flange portion extending around said hub and outwardly for engagement by said devices, said spiral gears being carried by the outer surface of the inner portion of said control member and by the inner portion of said hub, and a ball-bearing between said devices and said control member, said devices comprising rotary cams and means for turning them.

12. Inclination controlling mechanism for propeller blades, consisting of the combination of a propeller driving shaft, propeller blades having stub-shafts extending from them towards said driving shaft, a disk secured to said driving shaft and having bores receiving said stub-shafts for turning movement therein, a first bevel gear secured to each of said blades, a second bevel gear meshing with said first bevel gears, a block secured to said driving shaft and having a flat sided periphery, a control member having a bore fitting said block for longitudinal movement thereon, cooperating spiral gears carried by said second gear and said control member, devices for imparting longitudinal movement to said control member, said second gear having a hub surrounding the inner portion of said control member, said control member having a flange portion extending around said hub and outwardly for engagement by said devices, said spiral gears being carried by the outer surface of the inner portion of said control member and by the inner portion of said hub, a ball-bearing between said devices and said control member, said devices comprising rotary cams and means for turning them, and a flange carried by said driving shaft and secured to said block and extending beyond said block to hold said control member thereon.

In witness whereof I hereunto subscribe my name this 22 day of May A. D., 1930.

FRANK A. RINGWALD, Jr.